United States Patent
Jang et al.

(10) Patent No.: US 9,733,346 B1
(45) Date of Patent: Aug. 15, 2017

(54) METHOD FOR PROVIDING SOUND DETECTION INFORMATION, APPARATUS DETECTING SOUND AROUND VEHICLE, AND VEHICLE INCLUDING THE SAME

(71) Applicant: HYUNDAI MOTOR COMPANY, Seoul (KR)

(72) Inventors: Yoon Ho Jang, Suwon-si (KR); Jae Kwang Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/368,005

(22) Filed: Dec. 2, 2016

(30) Foreign Application Priority Data

Mar. 10, 2016 (KR) .................. 10-2016-0028659

(51) Int. Cl.
*G01S 11/14* (2006.01)
*B60Q 9/00* (2006.01)

(52) U.S. Cl.
CPC .............. *G01S 11/14* (2013.01); *B60Q 9/00* (2013.01)

(58) Field of Classification Search
CPC .................................. G01S 11/14; B60Q 9/00
See application file for complete search history.

(56) References Cited

U.S. PATENT DOCUMENTS

2017/0132934 A1* 5/2017 Kentley ................ G08G 1/202

FOREIGN PATENT DOCUMENTS

| JP | H05-85288 A | 4/1993 |
| JP | H06-245289 A | 9/1994 |
| JP | H06-344839 A | 12/1994 |
| JP | 2005-301751 A | 10/2005 |
| JP | 2007-065832 A | 3/2007 |
| KR | 10-2000-0014984 A | 3/2000 |
| KR | 10-2005-0117470 A | 12/2005 |

OTHER PUBLICATIONS

Korean Office Action dated Jan. 16, 2017, issued in Korean Application No. 10-2016-0028659.

* cited by examiner

*Primary Examiner* — Basil T Jos
(74) *Attorney, Agent, or Firm* — McDermott Will & Emery LLP

(57) ABSTRACT

A method for providing sound tracking information includes detecting a sound emitted adjacent to a subject vehicle and generating a sound tracking result based at least on sound data relating to the detected sound. A relative velocity of another vehicle operating near the subject vehicle is determined based on an angle of the other vehicle determined from the sound tracking result. A notification regarding the other vehicle is determined based on the relative velocity. The sound tracking result includes, for each of a plurality of angles relative to the subject vehicle in each of a plurality of frames of sound data according to time, an estimate of a probability of the presence of at least one other vehicle at each respective angle in each respective frame.

16 Claims, 11 Drawing Sheets

FIG. 6

| TYPE OF ROADS | | | THE MINIMUM WIDTH OF LANE (METER) | | |
|---|---|---|---|---|---|
| | | | RURAL AREA | URBAN AREA | DRIVEWAY FOR SMALL CARS |
| HIGHWAY | | | 3.50 | 3.50 | 3.25 |
| GENERAL ROAD | DESIGN SPEED (KILOMETER/ HOUR) | ≥ 80 | 3.50 | 3.25 | 3.25 |
| | | ≥ 70 | 3.25 | 3.25 | 3.00 |
| | | ≥ 60 | 3.25 | 3.00 | 3.00 |
| | | < 60 | 3.00 | 3.00 | 3.00 |

FIG. 7

| ANGLE(θ) | DISTANCE(R) | ANGLE(θ) | DISTANCE(R) | ANGLE(θ) | DISTANCE(R) |
|---|---|---|---|---|---|
| 1 | 0.052365 | 31 | 1.802581 | 61 | 5.41214 |
| 2 | 0.104762 | 32 | 1.874808 | 62 | 5.642176 |
| 3 | 0.157223 | 33 | 1.948222 | 63 | 5.887828 |
| 4 | 0.20978 | 34 | 2.023525 | 64 | 6.150908 |
| 5 | 0.262466 | 35 | 2.100622 | 65 | 6.433517 |
| 6 | 0.315313 | 36 | 2.179627 | 66 | 6.738196 |
| 7 | 0.368354 | 37 | 2.260662 | 67 | 7.067552 |
| 8 | 0.421622 | 38 | 2.343856 | 68 | 7.425255 |
| 9 | 0.475153 | 39 | 2.429351 | 69 | 7.815261 |
| 10 | 0.528981 | 40 | 2.517298 | 70 | 8.242426 |
| 11 | 0.583141 | 41 | 2.607858 | 71 | 8.712625 |
| 12 | 0.63767 | 42 | 2.701211 | 72 | 9.233042 |
| 13 | 0.692604 | 43 | 2.797544 | 73 | 9.812549 |
| 14 | 0.747984 | 44 | 2.897066 | 74 | 10.46223 |
| 15 | 0.803847 | 45 | 3 | 75 | 11.19614 |
| 16 | 0.860236 | 46 | 3.10658 | 76 | 12.03283 |
| 17 | 0.917192 | 47 | 3.217105 | 77 | 12.99441 |
| 18 | 0.974759 | 48 | 3.331836 | 78 | 14.11387 |
| 19 | 1.032983 | 49 | 3.451104 | 79 | 15.43364 |
| 20 | 1.09191 | 50 | 3.575259 | 80 | 17.01382 |
| 21 | 1.151592 | 51 | 3.70469 | 81 | 18.94122 |
| 22 | 1.212078 | 52 | 3.839823 | 82 | 21.34606 |
| 23 | 1.273424 | 53 | 3.981133 | 83 | 24.43298 |
| 24 | 1.335686 | 54 | 4.129144 | 84 | 28.54301 |
| 25 | 1.398923 | 55 | 4.284443 | 85 | 34.29004 |
| 26 | 1.463197 | 56 | 4.447681 | 86 | 42.90181 |
| 27 | 1.528576 | 57 | 4.619593 | 87 | 57.24306 |
| 28 | 1.595128 | 58 | 4.801001 | 88 | 85.90797 |
| 29 | 1.662927 | 59 | 4.992836 | 89 | 171.8667 |
| 30 | 1.73205 | 60 | 5.19615 | 90 | |

METHOD FOR PROVIDING SOUND DETECTION INFORMATION, APPARATUS DETECTING SOUND AROUND VEHICLE, AND VEHICLE INCLUDING THE SAME

CROSS-REFERENCE TO RELATED APPLICATION

This application claims priority to and the benefit of Korean Patent Application No. 10-2016-0028659, filed on Mar. 10, 2016 in the Korean Intellectual Property Office, the disclosure of which is hereby incorporated by reference in its entirety as if fully set forth herein.

TECHNICAL FIELD

The disclosure relates generally to a method for providing sound detection information and an apparatus for detecting a sound emitted around a subject vehicle, and more particularly, to a method and an apparatus for providing tracking information about sounds so as to recognize vehicles running adjacent to a subject vehicle, and a vehicle capable of recognizing traffic based on the tracking information about the sounds via a driver assistance device.

BACKGROUND

There are various types of sounds emitted adjacent to a vehicle driving on a road. If a driver is an aged person having at least partially impaired hearing or a person who has a bad sense of sound direction, he or she would be insensitive to such sounds and unable to produce a response to a particular sound made by a warning horn, a siren, or the like, which he or she should pay attention to. In addition, since in-vehicle technology providing sound insulation has been developed, it is likely that even a driver having great hearing could not correctly hear a noise/sound emitted outside a vehicle. The driver's inability to sense such sounds may put the driver's safety at risk, notably in cases in which the driver does not keep his/her eyes forward when he/she listens to a specific sound from the rear of the vehicle.

Accordingly, it might be beneficial to provide information about a particular sound, such as what kind of sounds exists adjacent to a vehicle, which direction a sound comes from, and the like, to a driver without disruptions to driving safety. However, if a driver receives information about sounds generated by his or her own vehicle, such as sibilant voices from tires, driving safety may be compromised as a result of information overload and notifications about such sound information should not be generated or delivered.

SUMMARY

An apparatus, a method, and a vehicle are provide a driver with specific information regarding vehicles running adjacent to the vehicle based at least on tracking information about sounds.

A method for providing sound tracking information can include detecting a sound emitted adjacent to a subject vehicle and generating a sound tracking result based at least on sound data relating to the detected sound. A relative velocity of another vehicle operating near the subject vehicle is determined based on an angle of the other vehicle determined based on the sound tracking result. A notification regarding the other vehicle is generated based on the relative velocity. The sound tracking result includes, for each of a plurality of angles relative to the subject vehicle in each of a plurality of frames of sound data according to time, an estimate of a probability of the presence of at least one other vehicle at each respective angle in each respective frame.

The step for determining the relative velocity of the other vehicle can include determining a first distance between the subject vehicle and the other vehicle in a first frame based on a first angle of the other vehicle and a width of a lane where the subject vehicle operates, determining a second distance between the subject vehicle and the other vehicle in a second frame based on a second angle of the other vehicle and the width of the lane, and determining the relative velocity by dividing a different between the first distance and the second distance by a time gap between the first and the second frames.

The width of the lane can be determined by referring to a dataset, a table, or a list including a specific value of lane width corresponding to a type of road and a division of area where the subject vehicle operates.

The first or the second distance can be determined according to the width of the lane and according to a mapping table relating each of a plurality of angles with a corresponding distance.

The step for generating the notification regarding the other vehicle can include determining whether the relative velocity falls within a predetermined acceptable range, and blocking the notification regarding the other vehicle when the relative velocity is outside of the acceptable range.

An apparatus for providing sound tracking information can include a sound tracker, a vehicle information processor, and an error avoider. The sound tracker is configured to detect a sound emitted adjacent to a subject vehicle and generate a sound tracking result based at least on sound data relating to the detected sound. The vehicle information processor is configured to determine a relative velocity of another vehicle operating near the subject vehicle based on an angle of the other vehicle determined based on the sound tracking result. The error avoider is configured to determine whether a notification regarding the other vehicle should be generated based on the determined relative velocity. The sound tracking result includes, for each of a plurality of angles relative to the subject vehicle in each of a plurality of frames of sound data according to time, an estimate of a probability of the presence of at least one other vehicle at each respective angle in each respective frame.

The vehicle information processor can be configured to determine a first distance between the subject vehicle and the other vehicle in a first frame based on a first angle of the other vehicle and a width of a lane where the subject vehicle operates, determine a second distance between the subject vehicle and the other vehicle in a second frame based on a second angle of the other vehicle and the width of the lane, and determine the relative velocity by dividing a difference between the first distance and the second distance by a time gap between the first and the second frames.

The width of the lane can be determined by referring to a dataset, a table, or a list including a specific value of lane width corresponding to a type of road and a division of area where the subject vehicle operates.

The first or the second distance can be determined according to the width of the lane and according to a mapping table relating each of a plurality of angles with a corresponding distance.

The error avoider can be configured to determine whether the relative velocity falls within a predetermined acceptable range, and block the notification regarding the other vehicle when the relative velocity is outside of the acceptable range.

A vehicle can include a multi-channel microphone, a sound tracking device, and a notification interface. The multi-channel microphone is configured to detect a sound emitted adjacent to the vehicle to generate sound data relating to the detected sound. The sound tracking device is configured to determine a relative velocity of another vehicle operating near the vehicle based on an angle of the other vehicle determined based on the sound tracking result, and to determine whether to generate a notification regarding the other vehicle based on the determined relative velocity. The notification interface is configured to acoustically or visually provide to a driver information about at least one other vehicle adjacent to the vehicle when the notification is generated. The sound tracking result includes, for each of a plurality of angles relative to the vehicle in each of a plurality of frames of sound data according to time, an estimate of a probability of the presence of at least one other vehicle at each respective angle in each respective frame.

The sound tracking device can be further configured to determine a first distance between the vehicle and the other vehicle in a first frame based on a first angle of the other vehicle and a width of a lane where the vehicle operates, determine a second distance between the vehicle and the other vehicle in a second frame based on a second angle of the other vehicle and the width of the lane, and determine the relative velocity by dividing a difference between the first distance and the second distance by a time gap between the first and the second frames.

The width of the lane can be determined by referring to a dataset, a table, or a list including a specific value of lane width corresponding to a type of road and a division of area where the subject vehicle operates.

The first or the second distance can be determined according to the width of the lane and according to a mapping table relating each of a plurality of angles with a corresponding distance.

The sound tracking device can be further configured to determine whether the relative velocity falls within a predetermined acceptable range, and block the notification regarding the other vehicle when the relative velocity is outside of the acceptable range.

The multi-channel microphone can include at least two microphones arranged in a rear of the vehicle.

An apparatus for providing sound tracking information in a vehicle includes a processing system. The processing system includes at least one data processor and at least one computer-readable memory storing a computer program. Herein, the processing system is configured to cause the apparatus to determine a relative velocity of another vehicle operating near the subject vehicle based on an angle of the other vehicle determined based on a sound tracking result and to generate a notification regarding the other vehicle based on the relative velocity. The sound tracking result includes, for each of a plurality of angles relative to the subject vehicle in each of a plurality of frames of sound data according to time, an estimate of a probability of the presence of at least one other vehicle at each respective angle in each respective frame.

A non-transitory computer readable medium can store a program for causing a processing system to execute a process for providing sound tracking information. The process includes determining a relative velocity of another vehicle operating near a subject vehicle based on an angle of the other vehicle determined based on a sound tracking result, and generating a notification regarding the other vehicle based on the relative velocity. The sound tracking result includes, for each of a plurality of angles relative to the subject vehicle in each of a plurality of frames of sound data according to time, an estimate of a probability of the presence of at least one other vehicle at each respective angle in each respective frame.

BRIEF DESCRIPTION OF THE DRAWINGS

The accompanying drawings, which are included to provide a further understanding of the invention and are incorporated in and constitute a part of this application, include illustrative embodiment(s) and together with the description serve to explain the principle of operation the disclosed embodiments. In the drawings:

FIGS. 6 and 7 are reference tables used by the vehicle information processor shown in FIG. 2 for determining the relative position and the relative velocity;

DETAILED DESCRIPTION

Figure 1:
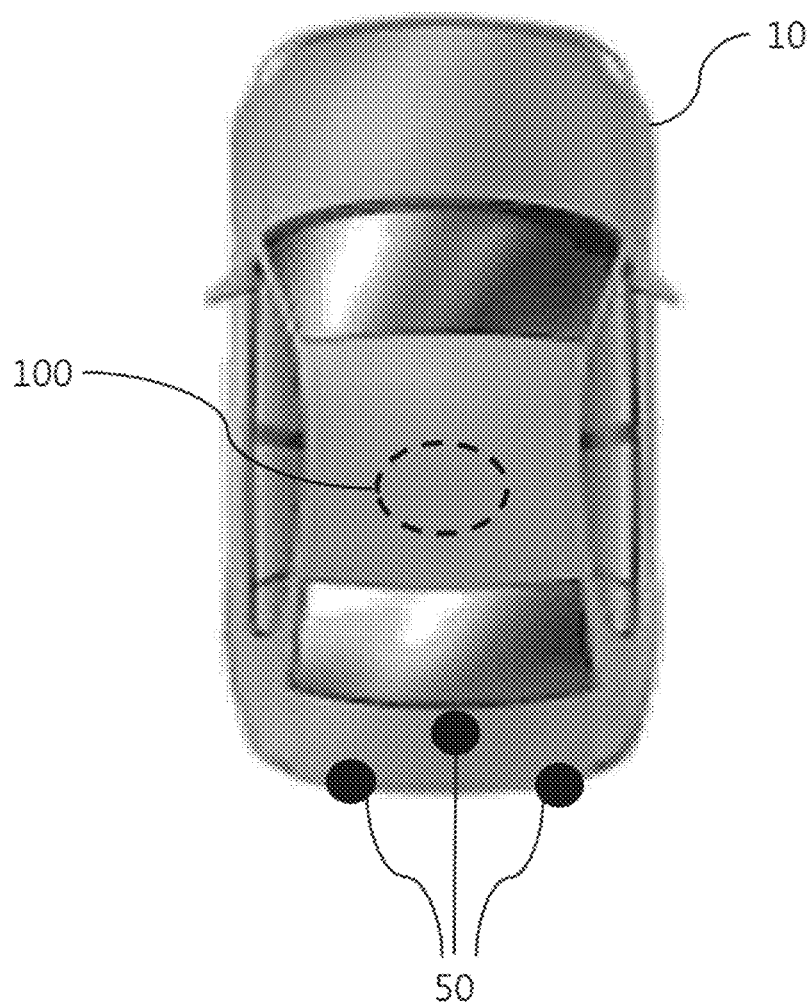
FIG. 1 shows a vehicle according to an illustrative embodiment of the disclosure.

Reference will now be made in detail to the preferred embodiments of the invention, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

In the description of the invention, certain detailed explanations of related art are omitted when it is deemed that they may unnecessarily obscure the essence of the invention. The features of the invention will be more clearly understood from the accompanying drawings and should not be limited by the accompanying drawings. It is to be appreciated that all changes, equivalents, and substitutes that do not depart from the spirit and technical scope of the disclosure are encompassed in the disclosure.

FIG. 1 shows a vehicle according to an embodiment of the disclosure.

As shown, a vehicle 10 can provide a notification to a driver after generating information about a specific sound, such as what kind of sound(s) occurs adjacent to the vehicle 10 while driven by the driver, which direction the sound(s) come(s) from, and the like.

The vehicle 10 can include a multi-channel microphone 50 configured to sense a sound emitted outside of the vehicle 10 and a sound tracking apparatus 100 configured to generate information about a specific sound based at least on sound data collected by the multi-channel microphone 50. Each microphone of the multi-channel microphone 50 can be considered a single/separate channel. By way of example and not limitation, the vehicle can have 3 microphones in the multi-channel microphone 50. Though illustrative locations of the microphones in/on the vehicle 10 are shown in FIG. 1, the locations of the microphones can be changed.

Figure 2:
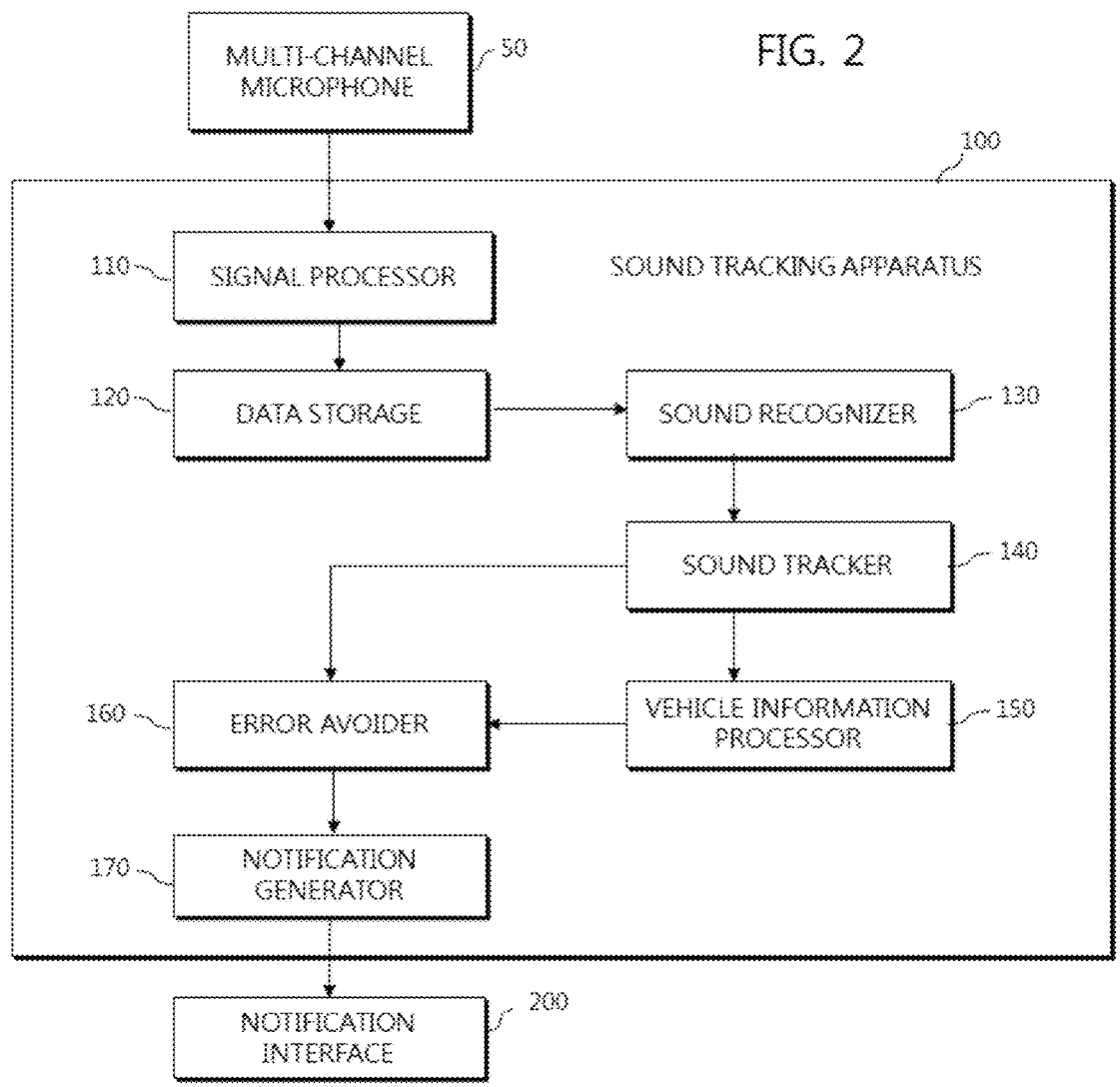
FIG. 2 is a block diagram showing components of a sound tracking apparatus such as that shown in FIG. 1.

Referring to FIG. 2, detailed operations of the sound tracking apparatus 100 are described.

FIG. 2 is a block diagram showing components of the sound tracking apparatus 100 shown in FIG. 1.

As shown, the sound tracking apparatus 100 can include a signal processor 110, a data storage 120, a sound recognizer 130, a sound tracker 140, a vehicle information processor 150, an error avoider 160, and a notification generator 170. By the way of example but not limitation, the sound tracking apparatus 100 can be designed to be equipped within a head unit of the vehicle 10. Additionally, the sound tracking apparatus 100 or elements thereof can be implemented using one or more processors coupled to a memory storing computer-executable instructions for causing the processor(s) to perform functions of the elements described herein including the functions performed by the signal processor 110, sound recognizer 130, sound tracker 140, vehicle information processor 150, error avoider 160, and notification generator 170.

The multi-channel microphone 50 can detect a sound emitted or occurring adjacent to the vehicle 10, generate sound data regarding the detected sound through an analog-digital conversion, and deliver the sound data into the signal processor 110.

There are various types of sounds occurring near, or close to, a vehicle. For example, there are engine sounds coming from other vehicles near the vehicle, sibilant voices from front and/or rear tires, sounds made by traffic signs, electric signs, or the like, sounds of nature, and so on.

A driver, while driving the vehicle 10, would like to know a status and location (e.g., relative to the driver's own vehicle 10) of another vehicle that may be present in a blind area in a forward, backward, and/or sideward direction relative to the vehicle 10. Herein, the status can include information on whether the other vehicle is trying to pass the vehicle 10.

Some of the sounds occurring or emitted outside the vehicle 10 may not reach or be heard by a driver because of an in-vehicle sound insulation system. Accordingly, when a warning horn sound is emitted, the driver would like to know which direction the warning horn sound comes from and/or whether the warning horn sound is relevant to the vehicle 10. If the driver properly recognizes the warning horn sound, for example based on an appropriate notification received by the sound tracking apparatus 100, the driver can slow down the vehicle, change lane, turn on an emergency lamp, or the like.

Further, when the volume of an in-vehicle audio system is turned up, the driver may not catch or hear a warning horn sound near the vehicle. In this case, it might be advantageous to acoustically or visually inform the driver of the event by warning the driver than the horn sound occurs nearby the vehicle via an in-vehicle audio system.

In some cases, the driver can be interested in another sound. For example, when a vehicle is stopped suddenly, a loud frictional sound can be generated because of friction between the ground and tires. The loud frictional sound can be relevant and can inform the driver of the vehicle 10 of the occurrence of a car accident or a near car accident. As another example, a loud bang sound occurs when a vehicle collides with another vehicle or an obstacle. If a bang sound occurs in front of or on the side of the driver's vehicle, or the like, the bang sound can be recognized and reported to the driver along with direction information about where the bang occurs. By providing information on such sounds to the driver, another subsequent car accident/clash can be avoided.

When a loud prolonged signal, such as a warning sound made by a siren provided in an ambulance or a police car, is detected nearby or close to the driver's vehicle, the driver should move his/her vehicle in order to allow the ambulance or the police car to pass the driver's vehicle. In such a situation, if the driver does not perform the required action, he or she can face legal punishment. Accordingly, it would be useful for the driver's vehicle to help the driver recognize the loud prolonged signal or the warning sound coming from the emergency vehicle or the government-operated vehicle.

The signal processor 110 can perform noise filtering of the delivered or detected sound data. Various noises, including noises that are difficult to understand, don't have a recognized characteristic, or don't have a recognized source, can be removed by the noise filtering. Most of the sounds of interest to the driver, such as a warning horn sound, a siren sound, a loud frictional sound, a bang, and the like, have a sufficiently high decibel (dB) level (e.g., over 70 dB). Thus, the signal processor 110 can also determine whether the sound data, after noise filtering has been performed, has a decibel level higher than, or equal to, a reference level (e.g., over 70 dB). If the sound data has a decibel level lower than the reference level, the sound data can be deleted by the signal processor 110.

The data storage 120 can store the sound data from which noise has been removed by filtering. The data storage 120 can store the sound data as a unit of a frame, and provide the sound data into the sound recognizer 130. By way of example and not limitation, the frame can include plural sound data collected at a particular same timing, and an interval between each of frames can be a specific constant time (e.g., 40 ms, 100 ms, or the like).

The sound recognizer 130 can analyze characteristics of sound data. Even if the sound data has a decibel level higher than the reference level, the sound data might not be important to the driver. For example, though sounds produced by a train, sounds produced by planes near an airport, or the like, can have a decibel level higher than the reference level, those sounds might not affect or be of concern to the driver of the vehicle. Similarly, noises occurring as a result of road construction or resurfacing may not be of concern to the driver. If the driver is informed of all of these sounds continuously, it is likely that the driver's response will be slow or nonexistent in cases when the driver should pay attention.

Regarding the sound data delivered from the data storage 120, the sound recognizer 130 can analyze characteristics of the sound data by extracting particular values in both a time domain and a frequency domain. The sound recognizer 130 can build a database including characteristic values including an average value and a variation value of the particular values. Herein, the characteristic values can include particular values such as values determined based on Mel-Frequency Cepstral Coefficients (MFCCs), a Total Spectrum Power (TSP), a Sub-band Spectrum Power (SSP), and/or a pitch frequency. The sound recognizer 120 can store an average value and a variation value for each predetermined time period (e.g., a frame of 100 ms) of the sound data in the database.

In the technical field of sound signal processing, Mel-Frequency Cepstrum (MFC) is one method of representing a short-term power spectrum of a sound. The MFC can be obtained based on a linear cosine transform of a log power spectrum on a nonlinear Mel scale of frequency. Mel-frequency cepstral coefficients (MFCCs) are coefficients that collectively make up an MFC. Generally, MFCCs use a pre-emphasis filter for a short-term sound data (signal), and then apply Discrete Fourier Transform (DFT). In MFCCs, a power spectrum can be obtained by Mel Filter Banks, and logarithm is used to the power spectrum. Then, MFCCs can be obtained by applying Discrete Cosine Transform (DCT) to the logarithm value.

The power spectrum can show an energy distribution in a predetermined frame, and the sub-band spectrum power can describe energy distribution values in generally four sub-band spectrums such as [0, ⅛f0], [⅛f0, ¼f0], [¼f0, ½f0] and [½f0, f0]. The pitch frequency can be obtained based at least on an autocorrelation function. Herein, pitch can be the fundamental frequency of an audio waveform and is a parameter in the analysis of sounds such as speech and music signals, and the pitch frequency can be estimated by the reciprocal of the time period between the original and the first valley on an average magnitude different function (AMDF) curve. After estimating the pitch frequency for sound data, pitch contour (PC), pitch standard deviation (PSTD), smooth pitch ratio (SPR) and non-pitch ratio (NPR) can be used as effective features for classifying the sound data into different categories.

The sound recognizer 130 can use a classifier configured to classify characteristic values about the sound data obtained by the above-described methods to recognize whether the sound data includes a specific sound which a driver would be interested in. The classifier can include one of a neural network classifier, a Support Vector Machine (SVM), and a Bayesian classifier.

Hereinafter, an example where the sound recognizer 130 uses the neural network classifier is described.

The classifier of the sound recognizer 130 can classify sounds among a plurality of classes based on a type of the sounds, and use the characteristic values of the obtained sound data to estimate or calculate a confidence level indicative of the confidence that the sound data belongs in the determined class based at least on a similarity between characteristics of the sound data and characteristics associated with each of the plurality of classes. That is, the confidence level can include a probability that the sound data is properly categorized in a specific class. The total summation of the confidence levels associated with a sound data can be one.

A sound classification result generated by the classifier of the sound recognizer 130 can include information about each class, a type of sound corresponding to each class, and a confidence level corresponding to each class.

The sound recognizer 130 can determine whether the confidence level of the sound data associated with a class is equal to or larger than a threshold (e.g., 0.7), and add a determination result into the sound classification result. That is, in a case when the confidence level is equal to or larger than the threshold, the sound recognizer 130 can determine and assign a specific class (e.g., the class corresponding to the above-threshold confidence level) as a type of the sound data.

Accordingly, the sound recognizer 130 can analyze characteristics of sound data to generate a sound classification result providing information about the type of sound in the sound data.

When a type of sound (or a target sound) is categorized as being in a specific class with a confidence level higher than the threshold, the sound tracker 140 can track a sound direction, i.e. a direction from which the sound comes, based at least on the sound data. The type of sound can be provided by the sound recognizer 130.

The sound tracker 140 can accumulate sound data included in consecutive frames, recognize a similarity between sound detected via each microphone in a waveform (taking into account the sound's time characteristic), and measure a difference between times of receipt of the sound data via each of the microphones. The sound's time characteristic can be provided by the sound recognizer 130.

The volume of the sound is in inverse proportion to the squared distance to the sound origin. Thus, when a distance to the sound origin is doubled, the volume of the sound can decrease by ¼ (approximately 6 dB). In a case that it is assumed that a typical vehicle has a width of about 2 m and a length of about 3 m, a difference between volumes of detected sounds (sound data) at different locations on the vehicle can be useful information to identify the location where the sound occurs.

By way of example and not limitation, when the multi-channel microphone 50 is equipped in a vehicle shown in FIG. 1, if a sound occurs at an upper right location in the figure (e.g., near the front right portion of the vehicle), a volume of sound detected by a microphone arranged at the front of the vehicle is larger than the volume of the same sound detected by microphones arranged at rear right and rear left portions of the vehicle. In addition, a volume of sound detected by the microphone arranged at a rear right of the vehicle is larger than that detected by the microphone arranged at the rear left of the vehicle.

Based at least on those characteristics, volumes of sounds collected from each of the microphones can be used for tracking a general direction of the origin of the sound relative to the subject vehicle's position and orientation.

Further, a difference between times of receipt of the sound via each of the microphones (e.g., signal delay) can be used for determining an angle towards a position where the sound occurs (relative to the subject vehicle). The sound tracker 140 stores table/matrix type data containing mapping information relating the angle towards a position where the sound occurs and a length of signal delay corresponding to each of microphones for the different angles. By way of example and not limitation, in the table/matrix type data, each one degree of angle is associated with a predetermined first time t1 (a signal delay for a first microphone), a predetermined second time t2 (a signal delay for a second microphone), and a predetermined third time t3 (a signal delay for a third microphone). Further, a probability that a tracking target is placed at the one degree angle position can be estimated based on the summation of values obtained by applying signal delays t1, t2, t3 to sound data stored in the data storage 120, which is collected via each of the microphones.

That is, delay values for each of the angles included in the table/matrix can be applied to a current signal (sound data) so as to measure a probability that a tracking target is placed at each degree. Accordingly, a location/position where a sound occurs can be estimated. It is because each combination of an angle about the location/position where the sound occurs and a signal delay corresponding to each of microphones can be one to one correspondence with each other.

Using that information, the sound tracker 140 can generate the sound tracking information for each angle relative to the vehicle 10 in consecutive frames.

The sound tracking information can include a probability of whether there is an object (e.g., another vehicle) at each angle, which is matched with a target sound in each frame continued according to a time.

Based on a sound tracking result obtained by tracking a sound direction (a process which is performed for any sound that is determined to be of a type of interest to the driver with a reliability higher than a threshold or a reference), the vehicle information processor 150 can determine a relative position and a relative velocity of objects corresponding to the type of the sounds.

In one illustrative embodiment of the invention, it is assumed that sounds having reliability higher than the threshold are obtained from another vehicle operating near (or adjacent to) the subject vehicle 10. In the example, the vehicle information processor 150 can calculate a relative position and a relative velocity of at least the other vehicle based on a sound tracking result delivered from the sound tracker 140.

Detailed operations of how the vehicle information processor 150 determines a relative position and a relative velocity are described later in relation to FIGS. 4 to 7.

According to whether a relative velocity of at least one other vehicle falls within an acceptable range, the error avoider 160 can remove some sound tracking result regarding the other vehicle having a relative velocity exceeding the acceptable range after considering it an error.

Based on a sound tracking result excluding an error detection, the notification generator 170 can generate the notification including information (location, speed, angle, etc.) about the other vehicle close to the subject vehicle.

The notification interface 200 can deliver, to a driver, information about a location where a sound occurs or is emitted based at least on the notification provided by the sound tracking apparatus 100. By way of example and not limitation, the notification interface 200 can acoustically, visually, or both acoustically and visually provide the notification information to the driver.

The notification interface 200 can be implemented in a Head Unit Display (HUD) or a cluster equipped in the vehicle 10, so as to provide visual information about a location where a sound occurs. Further, the notification interface 200 can be implemented in a navigation device coupled with the sound tracking apparatus 100 via a wired communication network such as a Controller Area Network (CAN) bus or the like. Further, the notification interface 200 can be included in a smart device, such as a smartphone, a tablet, a smartwatch, or the like, coupled with the sound tracking apparatus 100 via a short-range wireless technology such as BLUETOOTH, near field communication (NFC), Wi-Fi or the like.

Figure 3:
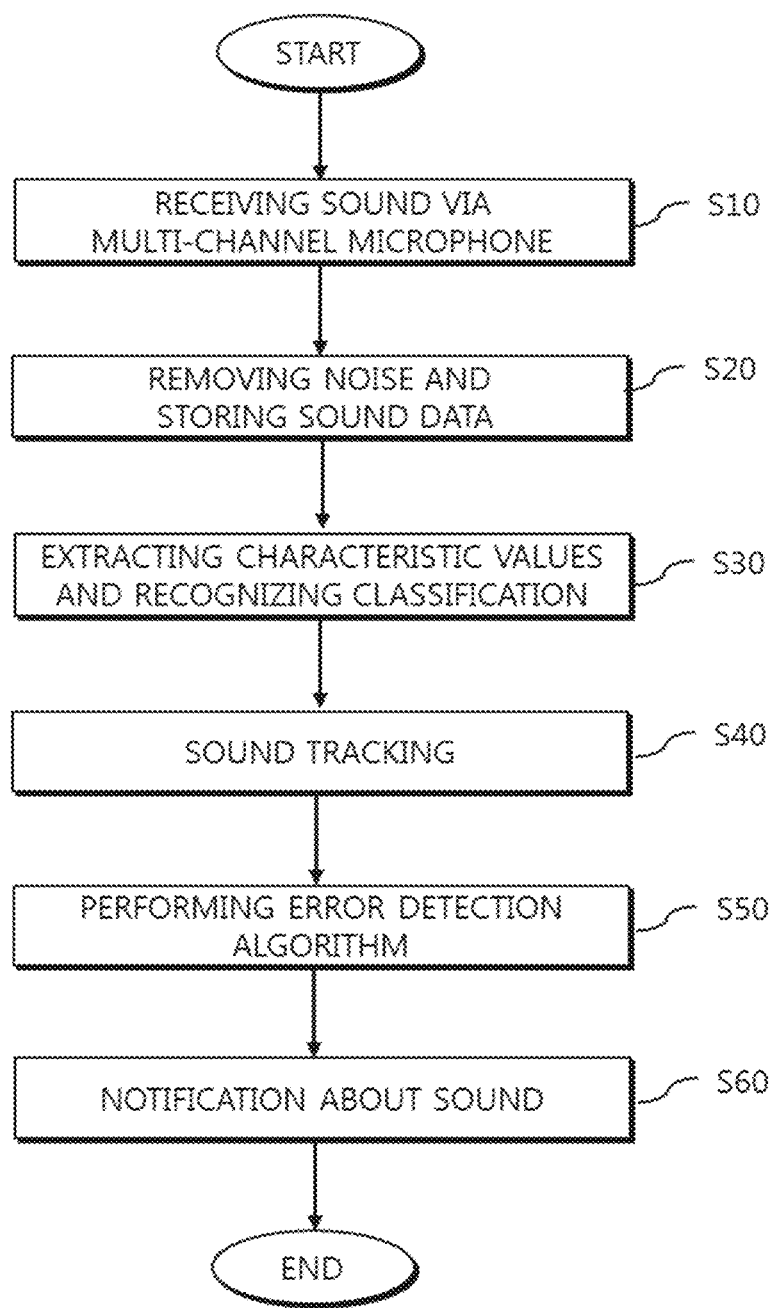
FIG. 3 is a flow diagram used to describe an operation method of the sound tracking apparatus shown in FIG. 2.
Figure 4:
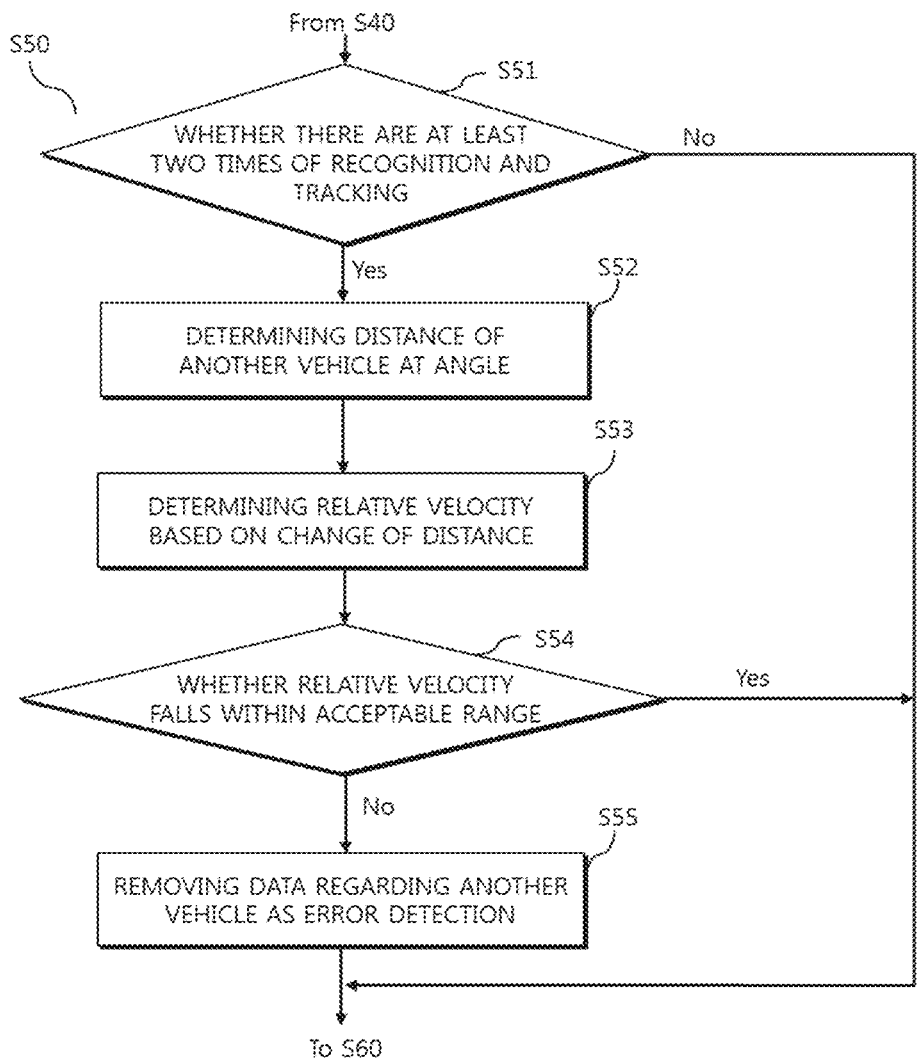
FIG. 4 is a flow diagram showing detailed information about the S50 step shown in FIG. 3.
Figure 5:
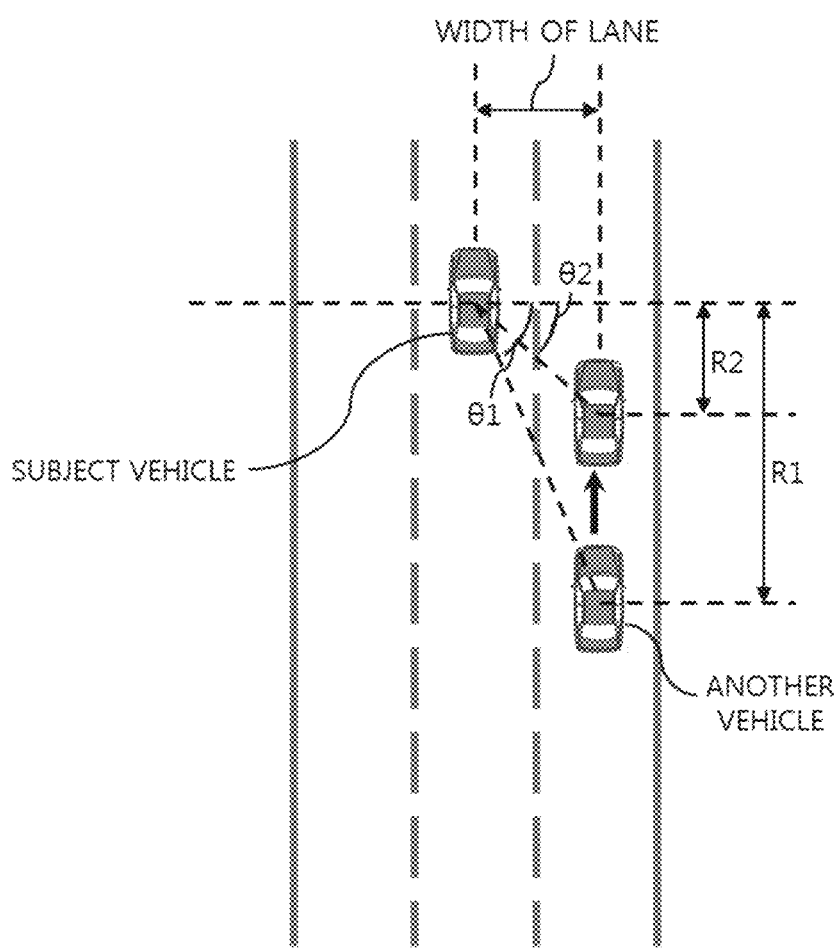
FIG. 5 is a schematic diagram showing an example of how a vehicle information processor such as that shown in FIG. 2 determines a relative position and a relative velocity.

FIG. 3 is a flow diagram used to describe an operation method of the sound tracking apparatus 100 shown in FIG. 2. FIG. 4 is a flow diagram showing detailed information about the S50 step shown in FIG. 3. FIG. 5 is a schematic diagram showing an example of how a vehicle information processor 150 shown in FIG. 2 determines a relative position and a relative velocity. FIGS. 6 and 7 are reference tables used by the vehicle information processor 150 shown in FIG. 2 for determining the relative position and the relative velocity.

Referring to FIGS. 2 to 7, operations of the sound tracking apparatus 100 shown in FIG. 2, i.e., a method for providing sound tracking information, are described.

The signal processor 110 can detect sounds occurring or emitted adjacent to a subject vehicle 10 based on sound data received from the multi-channel microphone 50 and processed through an analog-digital conversion (S10).

The signal processor 110 can perform a noise filtering of the obtained sound data, and the data storage 120 can store the sound data from which noise is removed (S20).

The sound recognizer 130 can then extract or identify characteristic values of the sound data, in a time domain and a frequency domain, from the sound data delivered from the data storage 120, and use a classifier to classify the characteristic values so as to generate a sound classification result (S30).

When sound data is categorized as being in a particular type or class of sounds with a confidence level higher than a threshold, the sound tracker 140 can generate information about a probability of whether an object or a target corresponding to the type or the class of sounds exists at each angle in each frame according to a time (S40).

The vehicle information processor 150 and the error avoider 160 execute an error detection algorithm so as to remove error included in the sound tracking result (S50).

FIG. 4 shows detailed steps included in the error detection step (S50) shown in FIG. 3.

The vehicle information processor 150 can determine whether an accumulated count of recognition and tracking regarding sound data, i.e., an accumulated count of sound tracking result, is larger than two. The comparison is performed because the error detection algorithm can be used to compare at least two frames with each other when the accumulated account of sound tracking result is two or larger (or, in some examples, larger than two).

When the accumulated account of sound tracking result is less than two (i.e., "No" in step S51), the error detection algorithm is not executed, and then a S60 step is performed.

When a probability of an object's existence is equal to or larger than a threshold (e.g., 90%), it can be presumed that the object is located at a corresponding angle relative to the subject vehicle. Herein, it is assumed that the object is another vehicle operating close to the subject vehicle.

The vehicle information processor 150 can determine a distance between the other vehicle and the subject vehicle from an angle of another vehicle's position.

Referring to FIG. 5, another vehicle operates at a first angle θ1 relative to the subject vehicle in a first frame of the sound tracking result, while the other vehicle operates at a second angle θ2 relative to the subject vehicle in a second frame of the sound tracking result.

When a sound tracking result is obtained in the second frame, an accumulated account of sound tracking result is two (equal to or larger than two, i.e., "Yes" in the step S51) and the vehicle information processor 150 thus proceeds to estimate a distance between the other vehicle and the subject vehicle according to an angle of the other vehicle recognized in the sound tracking result (S52).

The vehicle information processor 150 can store sound tracking information corresponding to the first frame until sound tracking information corresponding to the second frame is gathered.

Based on the first angle θ1 of the other vehicle relative to the subject vehicle and a width of lane (e.g., a distance between centers of adjacent lanes), the vehicle information processor 150 can determine a first distance R1 between the subject vehicle and the other vehicle. As shown in FIG. 5, the first distance R1 may be measured along a direction parallel to the lanes of traffic.

At this time, the vehicle information processor 150 can use a previously stored table to determine a width of lane.

For example, FIG. 6 shows a predetermined and pre-stored table regarding a width of lane, which is stored in the vehicle information processor 150. Herein, the table regarding the width of lane includes a specific value, sometimes required by regulations, corresponding to a lane width for different types of roads (i.e., a type of road corresponding to a design speed) and a division of area (e.g., an urban, a suburban, or a rural area). The vehicle information processor 150 can receive information about a type of road and a division of area where the subject vehicle operates currently from a navigation device coupled via a wireless communication to the sound tracking apparatus 100, e.g. via a CAN bus, and determine a width of lane on a road where the subject vehicle operates currently based on the table about a width of lane.

During operations of the error detection algorithm, the vehicle information processor 150 does not have to determine a width of lane in every frame. However, in order to reduce an operational computation workload of the error detection algorithm, the vehicle information processor 150 can determine a width of a lane only when at least one of the type of road or the division of area is changed.

The vehicle information processor 150 can multiply a width of lane determined in the first frame by a tangent of the first angle θ1 so as to determine the first distance R1 between the subject vehicle and the other vehicle.

The vehicle information processor 150 can use a table mapping an angle to a distance, such as the table shown in FIG. 7, to enhance performance of the error detection algorithm by omitting processes for calculating the first distance R1.

The table shown in FIG. 7 relates each angle θ to a distance R in a specific width of lane (e.g., 3 m). That is, in the table, the distance R can be obtained by multiplying a tangent of an angle θ by a specific width of lane.

The vehicle information processor 150 can store different tables each for a different width of lane (e.g., 3 m, 3.25 m, 3.5 m) shown in FIG. 6, and determine the first distance R1 based on the table corresponding to a recognized width of lane.

Likewise, the vehicle information processor 150 can use a width of lane determined in a second frame and a second angle θ2 to determine a second distance R2 between the subject vehicle and the other vehicle.

Figure 9:
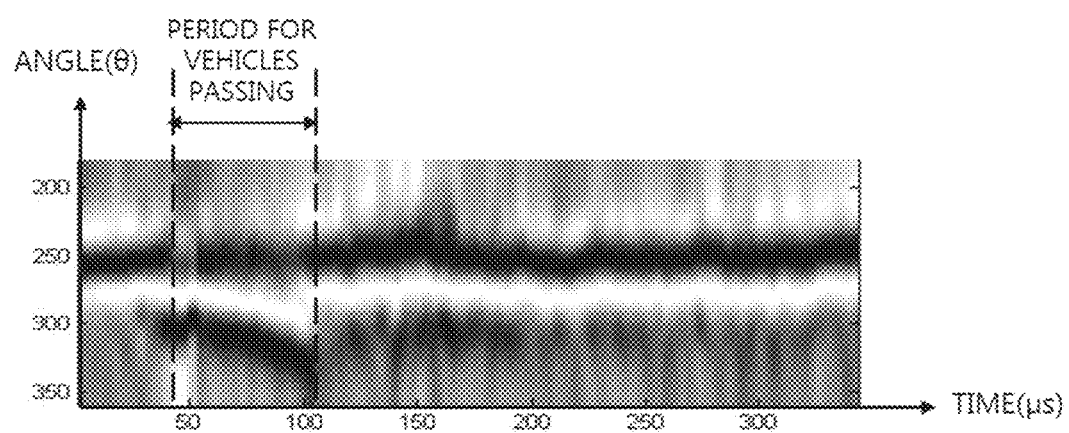
FIG. 9 is a graph showing a sound tracking result under the driving condition shown in FIG. 8.

The first angle θ1 and the second angle θ2 can be respectively determined by a median value of the minimum angle and the maximum angle recognized as the other vehicle from the sound tracking result in order to increase accuracy of a real angle between the subject vehicle and a center of the other vehicle. For example, as shown in FIG. 9, when another vehicle is recognized in a range of 250 to 260 degree at a time of 300 μs, an angle of the other vehicle can be determined as 255° (degree).

The vehicle information processor 150 uses a difference between the first distance R1 of the first frame and the second distance R2 of the second frame, and a period of sound tracking, to estimate a relative velocity of the other vehicle. The period of sound tracking is measured as the length of a cycle of generating a sound tracking result, i.e., a time difference between the first frame and the second frame. Herein, the period of sound tracking can be a predetermined time, which is previously determined and stored as a specification of the sound tracking apparatus 100. In one example, the period of sound tracking is 40 ms.

In this way, the vehicle information processor 150 can subtract the first distance R1 from the second distance R2 to determine a travel distance of the other vehicle, and divide the travel distance by the period of sound tracking so as to determine a relative velocity (S53).

Herein, the relative velocity obtained by the vehicle information processor 150 can be delivered to other modules/units for executing the error detection algorithm as well as a time to collision (TTC) algorithm in order to make full use of obtaining predictive collision information.

The error avoider 160 can determine whether the relative velocity of the other vehicle falls within a predetermined acceptable range (S54). Herein, the acceptable range is a scope of relative velocity of general other vehicles operating on another lane in the same direction as the subject vehicle, which can be determined experimentally. That is, if another vehicle has a relative velocity exceeding the acceptable range, the other vehicle can be considered to be operating on the opposite side of the roadway, i.e. in another lane in the opposite direction relative to the subject vehicle.

By way of example and not limitation, the acceptable range could be from −30 kph (kilometer per hour) to 160 kph. Herein, when a value subtracting the first distance R1 to the second distance R2 is negative, a relative velocity could be negative thereby indicating that the other vehicle has a relative velocity in the opposite direction relative to the subject vehicle. For example, though both vehicles drive in the same direction, the other vehicle may operate more slowly than the subject vehicle.

An operator or a driver generally pays attention to other vehicles operating adjacent to the subject vehicle, e.g., on the same or the next lane in the same direction, behind the subject vehicle. However, an operator or driver generally does not care about other vehicles operating on the opposite side of the roadway (e.g., heading in the opposite direction) because those vehicles generally do not affect operation of the subject vehicle. Accordingly, since a notification or alert regarding other vehicles operating on the opposite side could be a disturbance to the driver resulting in lower driving safety, the acceptable range can be used for removing notifications relating to such vehicles based on the result of the error detection.

Thus, when it is determined that a relative velocity falls within the acceptable range ("Yes" of the step S54), sound data regarding the other vehicle would not be removed as an error detection, and processing would proceed to step S60.

However, when it is determined that a relative velocity is outside of the acceptable range ("No" of the step S54), the error avoider 160 can remove sound data regarding the other vehicle (e.g., when a relative velocity is beyond −30 kph) as an error detection because it might be highly likely that the other vehicle operates on the opposite side of the roadway (S55).

For example, the error avoider 160 can adjust (or decrease) a probability value of angle range corresponding to the other vehicle in the sound tracking result so that a notification about the other vehicle is not generated so as to successfully remove an error detection. That is, the error avoider 160 can recognize whether another vehicle operates on the opposite side based on its relative velocity, and can thereby determine whether a notification regarding the another vehicle is to be generated.

The notification generator 170 can generate information regarding the other vehicle based on the sound tracking result in cases in which the sound data is not excluded as a result of the error detection process. The notification interface 200 then receives the information from the notification generator 170, and provides to a driver information about the area or region where the sound occurs (S60).

Figure 8:
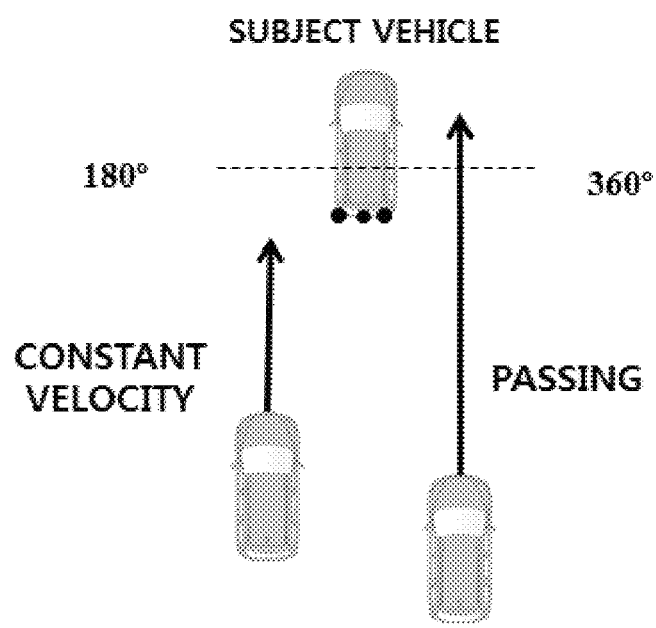
FIG. 8 illustratively shows an example of a driving condition.

FIG. 8 illustratively shows an example of a driving condition, and FIG. 9 shows a sound tracking result under the driving condition shown in FIG. 8.

Referring to FIG. 8, it is assumed that the subject vehicle 10 operates at constant velocity, a first vehicle located in a left rear region of the subject vehicle 10 also operates at constant velocity (which is similar to a speed of the subject vehicle 10), and a second vehicle located in a right rear region of the subject vehicle 10 tries to overtake the subject vehicle 10.

FIG. 9 shows a graph illustrating a sound tracking result, according to a time, generated by the sound tracker 140 in a case when the subject vehicle operates under the circumstance shown in FIG. 8. In the graph, darker areas are indicative of a higher probability that another vehicle exists at each angle.

In FIG. 9, the first vehicle is continuously detected at about 250 degree, i.e. in left rear region of the subject vehicle 10, while the second vehicle passing the subject vehicle 10 is detected at positions gradually increasing from about 300 degree to about 360 degree during a passing time period between 45 and 105 μs.

According to a time, the vehicle information processor 150 can continuously calculate a relative velocity for each other vehicle in each frame. When an angle of another vehicle is not rapidly changed, like in the example shown in FIG. 9, the relative velocity of each other vehicle can be within the acceptable range. Thus, the error avoider 160 determines that there is no error to detect in the sound tracking result, so that operations for removing errors are not executed.

Figure 10:
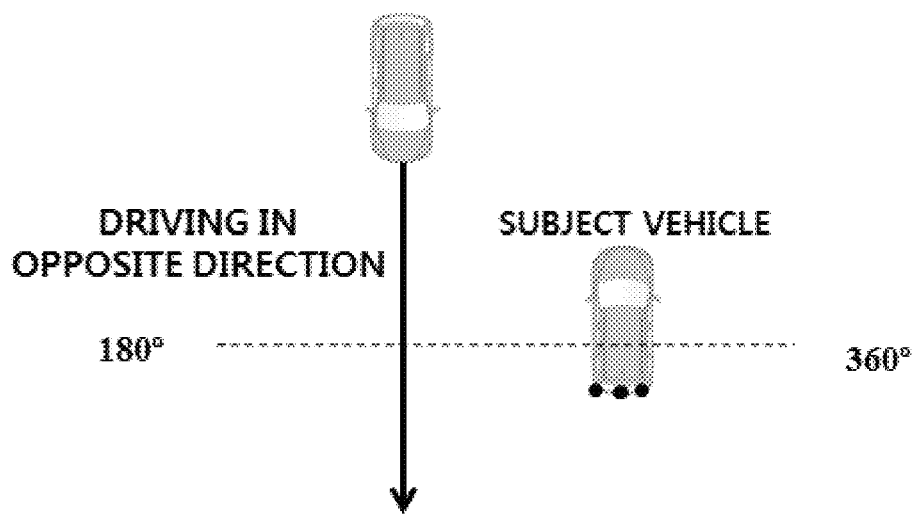
FIG. 10 illustratively shows another example of a driving condition.
Figure 11:
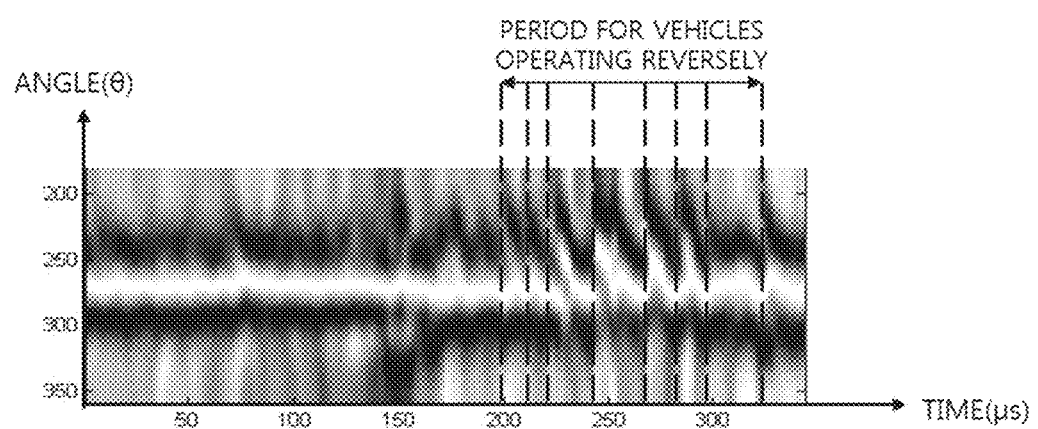
FIG. 11 is a graph showing a sound tracking result under the driving condition shown in FIG. 10.

FIG. 10 illustratively shows another example of a driving condition. FIG. 11 shows a sound tracking result under the driving condition shown in FIG. 10.

Referring to FIG. 10, it is assumed that the subject vehicle 10 operates at constant velocity while seven (7) other vehicles consecutively operate in the opposite side, i.e., in the opposite direction.

FIG. 11 shows a graph illustrating a sound tracking result, according to a time, generated by the sound tracker 140 in a case when the subject vehicle operates under the circumstance shown in FIG. 10. In the graph, darker areas are indicative of a higher probability that another vehicle exists at each angle.

In FIG. 11, each of seven (7) other vehicles can be consecutively detected at positions gradually decreasing from about 180 degree to about 250 degree in each short cycle of reverse operating period.

The vehicle information processor 150 can continuously calculate a relative velocity for each other vehicle in each frame, according to a time. When an angle of another vehicle is rapidly changed, like the example shown in FIG. 11, the relative velocity of each other vehicle can be beyond the acceptable range.

Thus, the error avoider 160 determines that there are error detections in the sound tracking result, so that operations for removing error are executed.

As described above, embodiments of the invention can provide to a driver an alert or a notification based only on a sound data occurring from other vehicles operating or located near the subject vehicle.

Further, unlike a Blind Spot Detection (BSD) device generally having a valid detection range limited to 45 to 80 degree in a rear side region of the subject vehicle, the embodiments of the disclosure can have a wide valid detection range of 180 degree or 360 degree (e.g., a range including at least all angles in a rear region of the subject vehicle) and can avoid error detection or erroneous alert regarding other vehicles operating in the opposite direction. The embodiments described herein can thus effectively handle noise in sound data.

The various embodiments disclosed herein, including embodiments of the sound tracking apparatus 100 and/or elements thereof, can be implemented using one or more processors coupled to a memory (or other non-transitory machine readable recording medium) storing computer-executable instructions for causing the processor(s) to perform the functions described above including the functions described in relation to the signal processor 110, sound recognizer 130, sound tracker 140, vehicle information processor 150, error avoider 160, and notification generator 170.

The aforementioned embodiments are achieved by combination of structural elements and features in a predetermined manner as described herein. Each of the structural elements or features should be considered selectively unless specified separately. Each of the structural elements or features may be carried out without being combined with other structural elements or features. Also, some structural elements and/or features may be combined with one another to constitute other embodiments of the invention. The order of operations described in the embodiments of the invention may be changed. Some structural elements or features of one embodiment may be included in another embodiment, or may be replaced with corresponding structural elements or features of another embodiment. Moreover, it will be apparent that some claims referring to specific elements may be combined with other claims referring to the other elements to constitute further embodiments.

The method in accordance with the above-described embodiment may be implemented as a computer executable program and stored in a computer readable recording medium. The computer executable program can be executed on one or more processors or microprocessors communicatively connected to the computer readable recording medium. The computer readable recording medium may be one of a ROM, a RAM, a CD-ROM, a magnetic tape, a floppy disk, an optical data storage device, etc. Further, the computer readable recording medium may be realized in the form of a carrier wave (for example, transmission over the Internet).

The computer readable recording medium may be distributed to computer systems connected by a network and be stored and executed as code which is readable by computers in a distributed manner. Further, functional programs, code and code segments to implement the above-described method may be deduced from the foregoing description.

Various modifications and variations can be made in the invention without departing from the spirit or scope of the disclosure. Thus, it is intended that the invention covers the modifications and variations of this invention provided they come within the scope of the appended claims and their equivalents.

What is claimed is:
1. A method for providing sound tracking information, the method comprising:
   detecting a sound emitted adjacent to a subject vehicle and generating a sound tracking result based at least on sound data relating to the detected sound;

determining a relative velocity of another vehicle operating near the subject vehicle based on an angle of the other vehicle determined based on the sound tracking result; and generating a notification regarding the other vehicle based on the relative velocity, wherein the sound tracking result includes, for each of a plurality of angles relative to the subject vehicle in each of a plurality of frames of sound data according to time, an estimate of a probability of the presence of at least one other vehicle at each respective angle in each respective frame.

2. The method according to claim 1, wherein the determining the relative velocity of the other vehicle comprises:

determining a first distance between the subject vehicle and the other vehicle in a first frame based on a first angle of the other vehicle and a width of a lane where the subject vehicle operates;

determining a second distance between the subject vehicle and the other vehicle in a second frame based on a second angle of the other vehicle and the width of the lane; and determining the relative velocity by dividing a difference between the first distance and the second distance by a time gap between the first and the second frames.

3. The method according to claim 2, wherein the width of the lane is determined by referring to a dataset, a table, or a list including a specific value of lane width corresponding to a type of road and a division of area where the subject vehicle operates.

4. The method according to claim 2, wherein the first or the second distance is determined according to the width of the lane and according to a mapping table relating each of a plurality of angles with a corresponding distance.

5. The method according to claim 1, wherein the generating the notification regarding the other vehicle comprises:

determining whether the relative velocity falls within a predetermined acceptable range; and blocking the notification regarding the other vehicle when the relative velocity is outside of the acceptable range.

6. An apparatus for providing sound tracking information, the apparatus comprising:

a sound tracker configured to detect a sound emitted adjacent to a subject vehicle and generate a sound tracking result based at least on sound data relating to the detected sound;

a vehicle information processor configured to determine a relative velocity of another vehicle operating near the subject vehicle based on an angle of the other vehicle determined based on the sound tracking result; and an error avoider configured to determine whether a notification regarding the other vehicle should be generated based on the determined relative velocity, wherein the sound tracking result includes, for each of a plurality of angles relative to the subject vehicle in each of a plurality of frames of sound data according to time, an estimate of a probability of the presence of at least one other vehicle at each respective angle in each respective frame.

7. The apparatus according to claim 6, wherein the vehicle information processor is further configured to:

determine a first distance between the subject vehicle and the other vehicle in a first frame based on a first angle of the other vehicle and a width of a lane where the subject vehicle operates;

determine a second distance between the subject vehicle and the other vehicle in a second frame based on a second angle of the other vehicle and the width of the lane; and determine the relative velocity by dividing a difference between the first distance and the second distance by a time gap between the first and the second frames.

8. The apparatus according to claim 7, wherein the width of the lane is determined by referring to a dataset, a table, or a list including a specific value of lane width corresponding to a type of road and a division of area where the subject vehicle operates.

9. The apparatus according to claim 7, wherein the first or the second distance is determined according to the width of the lane and according to a mapping table relating each of a plurality of angles with a corresponding distance.

10. The apparatus according to claim 6, wherein the error avoider is further configured to:

determine whether the relative velocity falls within a predetermined acceptable range; and block the notification regarding the other vehicle when the relative velocity is outside of the acceptable range.

11. A vehicle, comprising:

a multi-channel microphone configured to detect a sound emitted adjacent to the vehicle to generate sound data relating to the detected sound;

a sound tracking device configured to determine a relative velocity of another vehicle operating near the vehicle based on an angle of the other vehicle determined based on the sound tracking result, and to determine whether to generate a notification regarding the other vehicle based on the determined relative velocity; and a notification interface configured to acoustically or visually provide to a driver information about at least one other vehicle adjacent to the vehicle when the notification is generated, wherein the sound tracking result includes, for each of a plurality of angles relative to the vehicle in each of a plurality of frames of sound data according to time, an estimate of a probability of the presence of at least one other vehicle at each respective angle in each respective frame.

12. The vehicle according to claim 11, wherein the sound tracking device is further configured to:

determine a first distance between the vehicle and the other vehicle in a first frame based on a first angle of the other vehicle and a width of a lane where the vehicle operates;

determine a second distance between the vehicle and the other vehicle in a second frame based on a second angle of the other vehicle and the width of the lane; and determine the relative velocity by dividing a difference between the first distance and the second distance by a time gap between the first and the second frames.

13. The vehicle according to claim 12, wherein the width of the lane is determined by referring to a dataset, a table, or a list including a specific value of lane width corresponding to a type of road and a division of area where the subject vehicle operates.

14. The vehicle according to claim 12, wherein the first or the second distance is determined according to the width of the lane and according to a mapping table relating each of a plurality of angles with a corresponding distance.

15. The vehicle according to claim 11, wherein the sound tracking device is further configured to:

determine whether the relative velocity falls within a predetermined acceptable range; and block the notification regarding the other vehicle when the relative velocity is outside of the acceptable range.

16. The vehicle according to claim 11, wherein the multi-channel microphone comprises at least two microphones arranged in a rear of the vehicle.

* * * * *